(12) United States Patent
Freeman et al.

(10) Patent No.: US 7,616,826 B2
(45) Date of Patent: Nov. 10, 2009

(54) REMOVING CAMERA SHAKE FROM A SINGLE PHOTOGRAPH USING STATISTICS OF A NATURAL IMAGE

(75) Inventors: William T. Freeman, Acton, MA (US); Robert D. W. Fergus, Cambridge, MA (US); Barun Singh, Boston, MA (US); Aaron Phillip Hertzmann, Toronto (CA); Sam T. Roweis, Toronto (CA)

(73) Assignees: Massachusetts Institute of Technology, Cambridge, MA (US); University of Toronto (CA)

( * ) Notice: Subject to any disclaimer, the term of this patent is extended or adjusted under 35 U.S.C. 154(b) by 495 days.

(21) Appl. No.: 11/495,062

(22) Filed: Jul. 28, 2006

(65) Prior Publication Data

US 2008/0025627 A1     Jan. 31, 2008

(51) Int. Cl.
*G06K 9/40*     (2006.01)
*H04N 5/228*     (2006.01)
(52) U.S. Cl. ..................... 382/255; 382/260; 348/208.4
(58) Field of Classification Search ................. 382/255, 382/274, 260, 254; 348/208.4
See application file for complete search history.

(56) References Cited

U.S. PATENT DOCUMENTS

2005/0249429 A1*   11/2005   Kitamura .................... 382/255

OTHER PUBLICATIONS

Wainwright et al. (Scale Mixtures of Gaussians and the Statistics of Natural Images, Advances in Neural Information Processing Systems 12, MIT Press, 2000, pp. 1-7).*

Miskin et al. (Ensemble Learning for Blind Image Separation and Deconvolution, Advances in Independent Component Analysis, Springer-Verlag Publ., 2000, pp. 1-19).*

Apostoloff, N. and A. Fitzgibbon, "Bayesian Video Matting Using Learnt Image Priors," in *Conf. on Computer Vision and Pattern Recognition*, pp. 407-414 (2004).

Ben-Ezra, M. and S.K. Nayer, "Motion-Based Motion Deblurring," *IEEE Trans. on Pattern Analysis and Machine Intelligence* 26:(6):689-698 (2004).

Field, D.J. "What Is the Goal of Sensory Coding?", *Neural Computation* 6:559-601 (1994).

Bascle, B. et al., "Motion Deblurring and Super-resolution from an Image Sequence," in *European Conference on Computer Vision* (2):573-582 (1996).

"What is Optical Image Stabilizer?", http://www.canon.com/bctv/faq/optis.html, downloaded Jul. 18, 2006 (2 pp.).

(Continued)

*Primary Examiner*—Matthew C Bella
*Assistant Examiner*—Thomas A Conway
(74) *Attorney, Agent, or Firm*—Hamilton, Brook, Smith & Reynolds, P.C.

(57) ABSTRACT

A computer method and system for deblurring an image is provided. The invention method and system of deblurring employs statistics on distribution of intensity gradients of a known model. The known model is based on a natural image which may be unrelated to the subject image to be deblurred by the system. Given a subject image having blur, the invention method/system estimates a blur kernel and a solution image portion corresponding to a sample area of the subject image, by applying the statistics to intensity gradients of the sample area and solving for most probable solution image. The estimation process is carried out at multiple scales and results in a blur kernel. In a last step, the subject image is deconvolved image using the resulting blur kernel. The deconvolution generates a deblurred image corresponding to the subject image.

21 Claims, 4 Drawing Sheets

OTHER PUBLICATIONS

Caron, J.N. et al., "Noniterative blind data restoration by use of an extracted filter function," *Applied Optics* 41(32):6884-6889 (Nov. 2002).

Gull, S.F., "Bayesian Inductive Inference and Maximum Entropy," in *Maximum Entropy and Bayesian Methods in Science and Engineering*, vol. 1(53-74), G.J. Erikson and C.R. Smith (eds), Kluwer Academic Publishers, 53-74 (1988).

Jalobeanu, A., et al., "Estimation of Blur and Noise Parameters in Remote Sensing," in *Proc. of Int. Conf. on Acoustics, Speech and Signal Processing*, 4 pp. (2002).

Jordan, M.I. et al., "An Introduction to Variational Methods for Graphical Models," in *Machine Learning*, 37:183-233, Kluwer Academic Publishers (1999).

Levin, A. et al., "Learning How to Inpaint from Global Image Statistics," in *International Conference on Computer Vision (ICCV)*, pp. 305-312 (2003).

Levin, A. and Y. Weiss, "User assisted separation of reflections from a single image using a sparsity prior," in *ICCV*, vol. 1:602-613 (2004).

Liu, X. and A. El Gamal, "Simultaneous Image Formation and Motion Blur Restoration via Multiple Capture," in *Proc. Int. Conf. Acoustics, Speech, Signal Processing*, vol. 3:1841-1844 (2001).

Miskin, J. and D.J.C. MacKay, "Ensemble Learning for Blind Image Separation and Deconvolution," in *Adv. in Independent Component Analysis*, (M. Girolani, Ed.) Springer-Verlag (2000) 19 pp.

Neelamani, R. et al., ForWaRD: Fourier-Wavelet Regularized Deconvolution for Ill-Conditioned Systems, *IEEE Trans. on Signal Processing* 52:418-433 (2004).

Rav-Acha, A. and S. Peleg, "Two motion-blurred images are better than one," *Pattern Recognition Letters*, pp. 311-317 (2005).

Weiss, Y., "Deriving intrinsic images from image sequences," in *Eighth International Conference on Computer Vision*, vol. 2:68-75 (2001).

Richardson, W.H., "Bayesian-Based Iterative Method of Image Restoration," *Journal of the Optical Society of America* 62(1):55-59 (1972).

Roth, S. and M.J. Black, "Fields of Experts: A Framework for Learning Image Priors," in *Computer Vision and Pattern Recognition (CVPR)*, vol. 2, pp. 860-867 (2005).

Tappen, M.F. et al., "Exploiting the Sparse Derivative Prior for Super-Resolution and Image Demosaicing," *3rd Intl. Workshop on Statistical and Computational Theories of Vision* (associated with Intl. Conf. on Computer Vision), Nice, France, 24 pp. (2003).

Tsumuraya, F. et al., "Iterative blind deconvolution method using Lucy's algorithm," *Astronomy and Astrophysics* 282(2):699-708 (Feb. 1994).

Zarowin, C.B., "Robust, noniterative, and computationally efficient modification of van Cittert deconvolution optical figuring," *Journal of the Optical Society of America A* 11(10):2571-83 (Oct. 1994).

Kundur, D. and D. Hatzinakos, "Blind Image Deconvolution," *IEEE Signal Processing Magazine*, pp. 43-64 (May 1996).

Simoncelli, E.P., "Statistical Modeling of Photographic Images," in *Handbook of Video and Image Processing, 2nd edition*, Alan Bovik, ed., Academic Press (2005).

Kundur, D. and D. Hatzinakos, "Blind Image Deconvolution Revisited," *IEEE Signal Processing Magazine*, pp. 61-53 (Nov. 1996).

\* cited by examiner

REMOVING CAMERA SHAKE FROM A SINGLE PHOTOGRAPH USING STATISTICS OF A NATURAL IMAGE

GOVERNMENT SUPPORT

The invention was supported, in whole or in part, by a National Science Foundation (NSF), Grant No. 6897017, sponsor award number IIS-0413232. There may be certain Government rights in the invention.

BACKGROUND OF THE INVENTION

Camera shake, in which an unsteady camera causes blurry photographs, is a chronic problem for photographers. The explosion of consumer digital photography has made camera shake very prominent, particularly with the popularity of small, high-resolution cameras whose light weight can make them difficult to hold sufficiently steady. Many photographs capture ephemeral moments that cannot be recaptured under controlled conditions or repeated with different camera settings—if camera shake occurs for any reason, then that moment is "lost" instead of captured in the resulting image.

Shake can be mitigated by using faster exposures, but that can lead to other problems such as sensor noise or a smaller than desired depth of field. A tripod, or other specialized hardware, can eliminate camera shake, but these are bulky and most consumer photographs are taken with a conventional, handheld camera. Users may avoid the use of flash due to the unnatural tonescales that result. Many of the otherwise favorite photographs of amateur photographers are spoiled by camera shake. A method to remove that motion blur from a captured photograph would be an important asset for digital photography.

Camera shake can be modeled as a blur kernel, describing the camera motion during exposure, convolved with the image intensities. Thus, the task of deblurring an image is image deconvolution. Removing an unknown camera shake (where the blur kernel is not known) is a form of blind image deconvolution, which is a problem with a long history in the image and signal processing literature. For a survey on the literature in this area, see Kundur, D. and D. Hatzinakos, "Blind Image Deconvolution, *IEEE Signal Processing Magazine* 13(3)43-64, May 1996. Existing blind deconvolution methods typically assume that the blur kernel has a simple parametric form, such as a Gaussian or low-frequency Fourier components. However, the blur kernels induced during camera shake typically do not have simple forms, and often contain very sharp edges. Similar low-frequency assumptions are typically made for the input image, e.g., applying a quadric regularization. Such assumptions can prevent high frequencies (such as edges) from appearing in the reconstruction. Caron et al. in "Noniterative blind data restoration by use of an extracted filter function," *Applied Optics* 41(32): 6884-6889, November 2002, assume a power-law distribution on the image frequencies. Power-laws are a simple form of natural image statistics that do not preserve local structure. Some methods (Jalobeanu, A. et al., "Estimation of blur and noise parameters in remote sensing," in *Proc. of Int. Conf. on Acoustics, Speech and Signal Processing,* 2002 and Neelamani, R. et al., "Forward: Fourier-wavelet regularized deconvolution for ill-conditioned systems, *IEEE Trans. on Signal Processing* 52:418-433, February 2004) combine power-laws with wavelet domain constraints but do not work for more complex blur kernels. To address this shortcoming, some of these methods attempt to manipulate the image in the Fourier domain to obey power-law constraints before using the wavelet domain to impose image structure constraints.

Deconvolution methods have been developed for astronomical images (Gull, S., "Bayesian inductive inference and maximum entropy", in *Maximum Entropy and Bayesian Methods,*. G. J. Erikson and C. R. Smith (eds.) Kluwer Academic Publishers, 53-74, 1998; Richardson, W, "Bayesian-based iterative method of image restoration," *Journal of the Optical Society of America, A* 62(1):55-59, 1972; Tsumuraya, F. et al., "Iterative blind deconvolution method using Lucy's algorithm, *Astronomy and Astrophysics* 282(2):699-708 February 1994; Zarowin, C., "Robust, noniterative, and computationally efficient modification of van Cittert deconvolution optical figuring," *Journal of the Optical Society of America A* 11(10):2571-83, October 1994), which have statistics quite different from the natural scenes desired in digital photography. Performing blind deconvolution in the astronomy domain is usually straightforward, as the blurry image of an isolated star reveals the point-spread-function.

Another approach is to assume that there are multiple images available of the same scene (Bascle, B. et al., "Motion Deblurring and Superresolution from an Image Sequence," in *European Conference on Computer Vision*(2):573-582 (1996); and Rav-Acha, A. and S. Peleg, "Two motion-blurred images are better than one," *Pattern Recognition Letters*, pp. 311-317, 2005). Hardware approaches include: optically stabilized lenses (Canon, Inc., "What is optical image stabilizer?" at www.canon.com/bctv/faq/optis.html 2006), specially designed CMOS sensors (Liu, X. and A. Gamal, "Simultaneous image formation and motion blur restoration via multiple capture," in *Proc. Int. Conf. Acoustics, Speech, Signal Processing,* Vol. 3, 1841-1844, 2001) and hybrid imaging systems (Ben-Ezra, M. and S. K. Nayar, "Motion-Based Motion Deblurring", *IEEE Trans. on Pattern Analysis and Machine Intelligence* 26(6): 689-698, 2004). However it is desirous to have a solution that works with existing cameras and imagery and that works for as many situations as possible, and thus does not assume any such hardware or extra imagery is available.

Recent work in computer vision has shown the usefulness of heavy-tailed natural image priors in a variety of applications, including denoising (Roth, S. and M. J. Black, "Fields of Experts: A Framework for Learning Image Priors, in CVPR (Computer Vision and Pattern Recognition), Vol. 2, pp. 860-867, 2005); superresolution (Tappen, M. F. et al., "Exploiting the sparse derivative prior for super-resolution and image demosaicing," 3*rd Intl. Workshop on Statistical and Computational Theories of Vision* (associated with Intl. Conf. on Computer Vision (2003); intrinsic images (Weiss, Y., "Deriving intrinsic images from image sequences," in ICCV (International Conference on Computer Vision), pp. 68-75, 2001; video matting (Apostoloff, N. and A. Fitzgibbon, "Bayesian image matting using learnt image priors," in "*Proceedings of Conference on Computer Vision and Pattern Recognition,* pp. 407-414, 2005; inpainting (Levin A. et al., "Learning How to Inpaint from Global Image Statistics," in *ICCV*, pp. 305-312, 2003; and separating reflections (Levin, A. and Y. Weiss, "User Assisted Separation of Reflections from a Single Image Using a Sparsity Prior," in *ICCV*, Vol. 1, pp. 602-613, 2004). Each of these methods is effectively "non-blind" in that the image formation process (e.g., the blur kernel in superresolution) is assumed to be known in advance.

Accordingly, the camera shake problem is underconstrained: there are simply more unknowns (the original image and the blur kernel) than measurements (the observed image). Hence, all practical solutions must make strong prior assumptions about the blur kernel, about the image to be recovered, or both. Traditional signal processing formulations of the problem usually make only very general assumptions in the form of frequency-domain power laws; the resulting algorithms can typically handle only very small blurs and not the complicated blur kernels often associated with camera shake. Furthermore, algorithms exploiting image priors specified in the frequency domain may not preserve important spatial-domain structures such as edges.

SUMMARY OF THE INVENTION

The present invention introduces a new technique for removing the effects of unknown camera shake from an image. This advance results from two key improvements over previous work. First, the present invention exploits recent research in natural image statistics, which shows that photographs of natural scenes typically obey very specific distributions of image gradients. Second, Applicants build on work by Miskin and MacKay (Miskin, J. and D. J. C. MacKay, "Ensemble Learning for Blind Image Separation and Deconvolution," in *Adv. in Independent Component Analysis*, M. Girolani, Ed. Springer-Verlag, 2000). Miskin and MacKay (2000) perform blind deconvolution on line art images using a prior on raw pixel intensities. Results are shown for small amounts of synthesized image blur. Applicants apply a similar variational scheme but for natural images using image gradients in place of intensities and augment the algorithm to achieve results for photographic images with significant blur. That is, the subjects of the present invention are photographic or other images having a full range of intensities and noise. Thus these subject images are much more complex than the noiseless binary intensity line art of Miskin and MacKay. The present invention addresses blur size of about 35 pixels for example. The line art in Miskin and MacKay only has small blurs (<10 pixels). Further gradient of intensities instead of prior used image intensities are employed (relied on) in calculations of the present invention.

In a preferred embodiment, the present invention employs a Bayesian approach that takes into account uncertainties in the unknowns. This allows one to find the blur kernel implied by a distribution of probable images. Given this kernel, the image is then reconstructed using a standard deconvolution algorithm.

In one embodiment, the invention computer method and system employ statistics on distribution of intensity gradients of a known model natural image. The model image may be unrelated (i.e., need not necessarily be related) to subject images being deblurred by the invention system. Given a subject image, the invention method and system estimate a blur kernel and a solution image portion corresponding to a sample area of the subject image. This is accomplished by applying the statistics to intensity gradients of the sample area and solving for the most probable solution image. In addition, the estimation process is carried out at multiple scales (for example, from coarse to fine resolutions) and results in a blur kernel. The subject image is deconvoluted using the resulting blur kernel and a deblurred image corresponding to the subject image is produced.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Applicants assume that image blur can be described in a single convolution: i.e., there is no significant parallax, any image-plane rotation of the camera is small and no parts of the scene are moving relative to one another during exposure. The present invention particularly applies to original images that are typically unusable and beyond touching-up. In effect, the invention method can help "rescue" photographic or videographic shots that would have otherwise been completely lost.

Figure 1A:
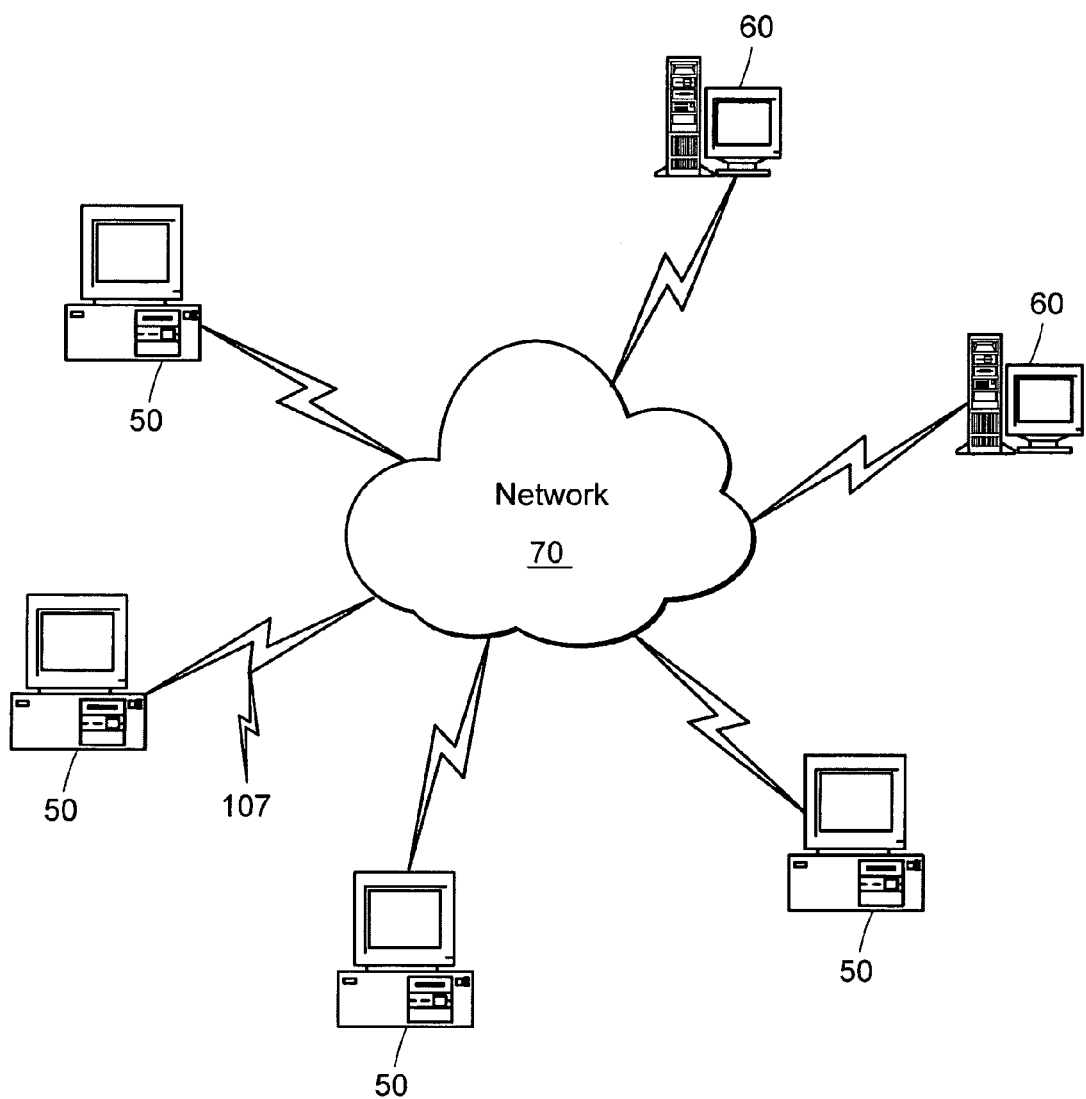
FIGS. 1a and 1b are schematic and block diagrams of a computer (digital processing) environment in which embodiments of the present invention operate.
Figure 1B:
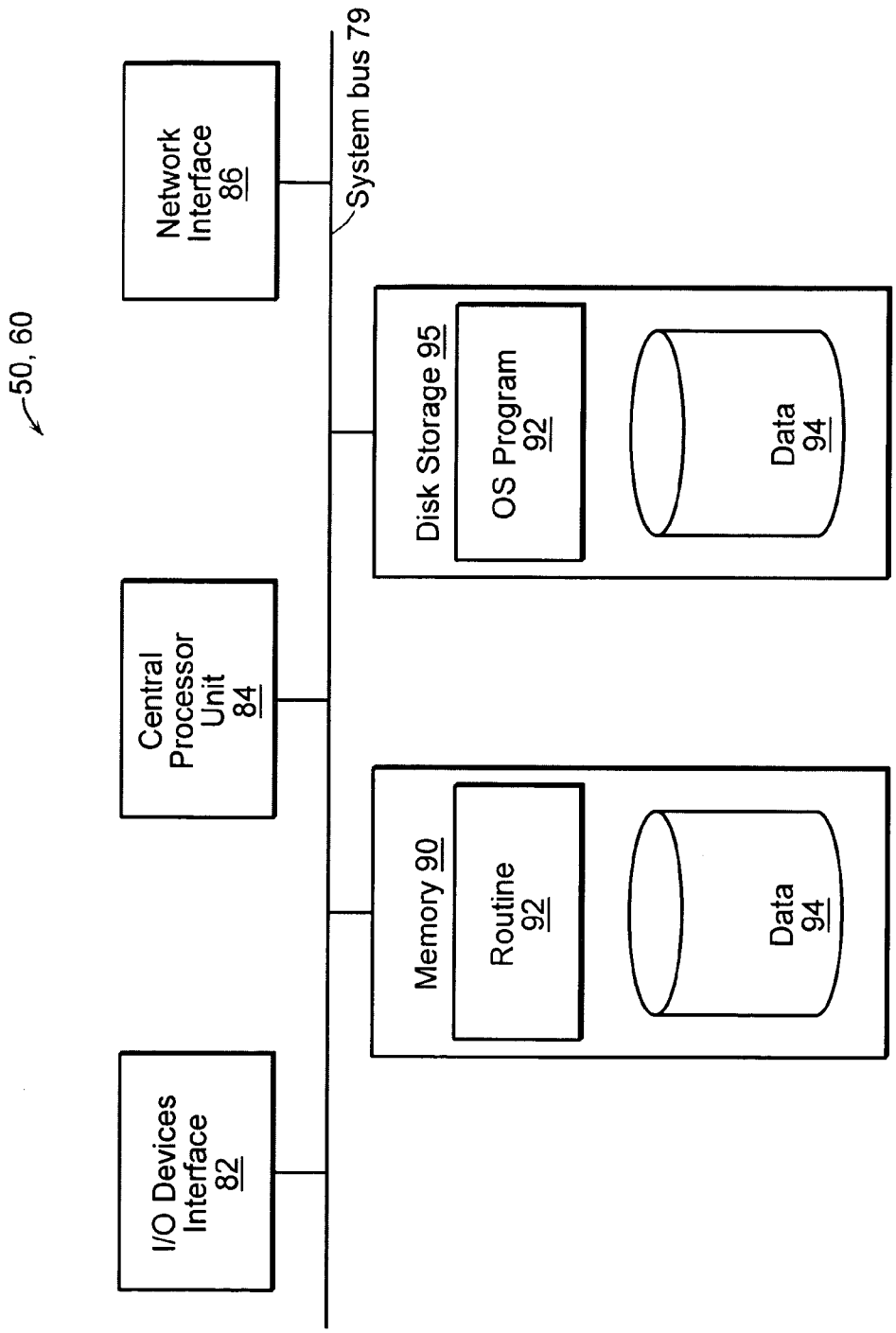

With reference to FIGS. 1a and 1b, client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 1b is a diagram of the internal structure of a computer (e.g., client processor/device 50 or server computers 60) in the computer system of FIG. 1a. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1a). Memory 90 provides volatile storage for computer software instructions 92 and data 94 used to implement an embodiment of the present invention (e.g., estimated blur kernel K, natural image gradient statistics, motion estimation process 15 and deblurring code 11 detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The present invention routine/procedure 92 (generally system 11) takes as input a blurred image B, which has been generated by convolution of a blur kernel K with a latent image L plus noise:

$$B = K \otimes L + N \qquad (1)$$

where $\otimes$ denotes discrete image convolution (with non-periodic boundary conditions), and N denotes sensor noise at each pixel. The invention routine 92 or system 11 assumes that the pixel values of the image are linearly related to the sensor irradiance. The latent image L represents the image one would have captured if the camera had remained perfectly still (i.e., there was no camera shake). The goal is to recover L from B without specific knowledge of K.

In order to estimate the latent image L from such limited measurements, it is essential to have some notion of which images are a-priori more likely. Recent research in natural image statistics have shown that, although images of real world scenes vary greatly in their absolute color distributions, they obey heavy-tailed distributions in their gradients (see Field, D., "What is the goal of sensory coding?" *Neural Computation* 6:559-601, 1994). The distribution of gradients has most of its mass on small values but gives significantly more probability to large values than a Gaussian distribution. This corresponds to the intuition that images often contain large sections of constant intensity or gentle intensity gradient interrupted by occasional large changes at edges or occlusion boundaries.

Figure 2:
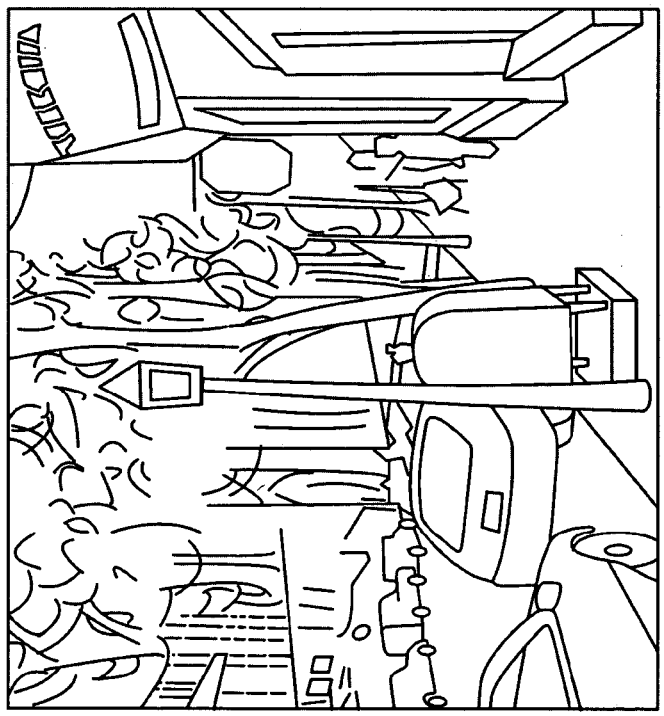
FIG. 2 illustrates the distribution of gradient magnitudes of a natural image (i.e., image of a natural scene).
Figure 2:
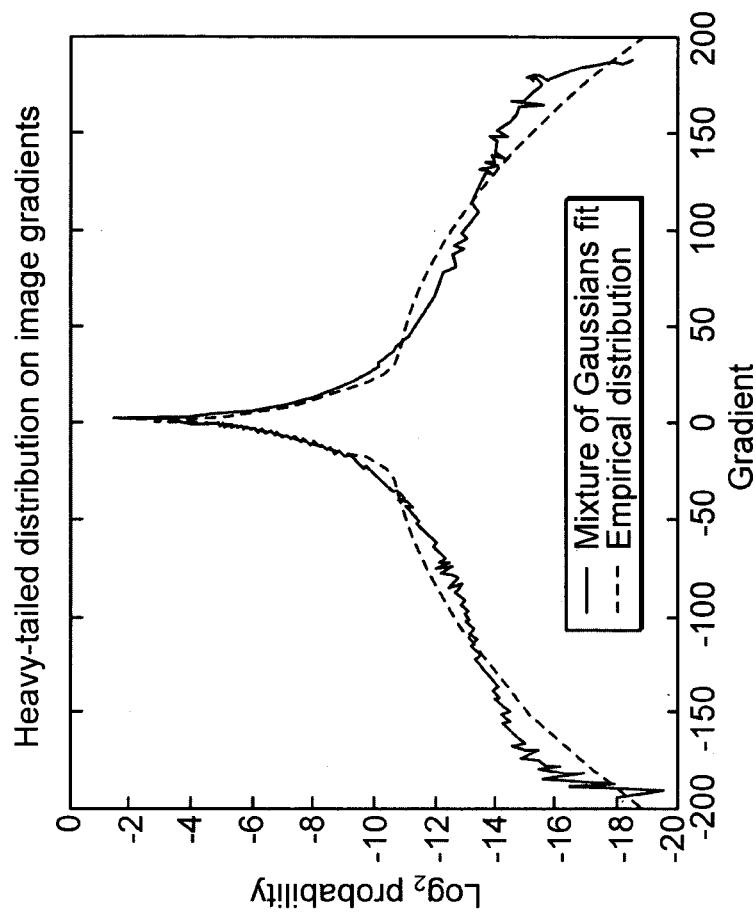

For example, FIG. 2 shows a natural image and a histogram of its gradient magnitudes. The distribution shows that the image contains primarily small or zero gradients, but a few gradients have large magnitudes. Recent image processing methods based on heavy-tailed distributions give state of the art results in image denoising (Roth and Black 2005 given above; and Simoncelli, E. P., "Statistical modeling of photographic images," in *Handbook of Image and Video Processing*, A. Bovik, ed., Ch. 4, 2005) and superresolution (Tappen, M. F. et al., above). In contrast, methods based on Gaussian prior distributions (including methods that use quadradic regularizers) produce overly smooth images.

In the present invention, the distribution over gradient magnitudes is represented with a zero-mean mixture-of-Gaussians model, as illustrated in FIG. 2. This representation was chosen because it can provide a good approximation of the empirical distribution, while allowing a tractable estimation procedure.

Figure 3:
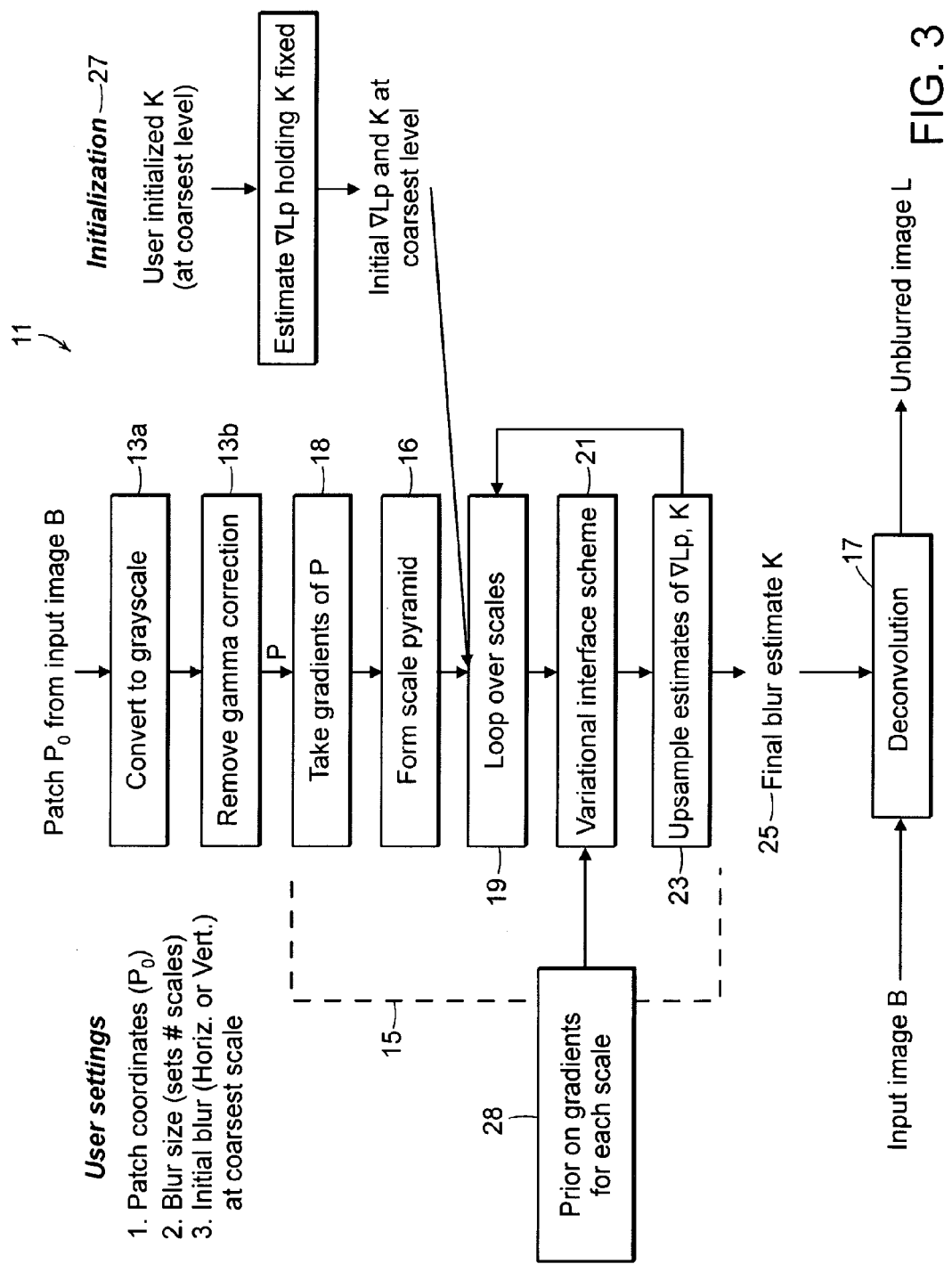
FIG. 3 is a flow diagram of an embodiment of the present invention.

Turning to FIG. 3, illustrated is an example embodiment of the invention method/system 11. The user supplies four inputs to the method/system 11, namely: the blurred image B, a rectangular patch $P_0$ within the blurred image, an upper bound on the size of the blur kernel (in pixels), and an initial guess as to orientation of the blur kernel (horizontal or vertical). In a preferred embodiment, the patch $P_0$ is a relatively small user selected area of the blurred image B that is rich in edge structure and avoids large areas of intensity saturation or uniformity.

With respect to maximum size of the blur kernel, the size of the blur encountered in images varies widely from a few pixels up to hundreds of pixels. Small blurs are hard to resolve if the maximum size parameter is initialized with a very large kernel. Conversely, large blurs will be cropped if too small a kernel is used. By examining any blur artifact in the input image B, the maximum size of the blur kernel is deduced. Likewise, the appropriate orientation initialization is determined by looking at any blur kernel artifact or edge in the input blurred image B.

In a preprocessing type step 13 (including steps 13a and 13b), input image B is converted to a linear color space. Step 13 corrects the tone field on the input image B and removes nonlinearities in image intensities. This is accomplished in one embodiment by an inverse gamma-correction 13b where pixel value=(CCD/CMOS sensor value)$^{1/\gamma}$ with typically $\gamma$=2.2. "CCD/CMOS" is the change color device utilized (incorporated) in the camera that generated subject blurred image B. In order to estimate the expected blur kernel, step 13a converts the input patch $P_0$ to grey scale and step 13b combines all the color channels of the original input image B within the user specified patch $P_0$ to produce a corresponding grayscale blurred patch P.

In estimation process 15, the blur kernel K is estimated from the input image B using patch P. The estimation process 15 is performed in a coarse-to-fine resolution fashion in order to avoid local minima. A preferred motion estimation process or blur kernel estimation 15 is detailed below (the blur kernel is akin to or indicative of camera motion that produced the input image B and thus blur kernel estimation 15 is synonymous to a motion or path estimation of the camera shake). Lastly, using the resulting estimated kernel K, step 17 applies a standard or other suitable deconvolution algorithm to estimate the latent (unblurred) image L.

Estimating the Blur Kernel

Given the grayscale blurred patch P, estimation process 15 estimates K and the latent patch image $L_p$ by finding the values with highest probability, guided by a prior 28 on the statistics of L of FIG. 2. It is noted that the statistics image L is an unrelated image to the problem image but serves as a known model natural image for processing all subject blurred images in the invention system 11. That is, a same one model natural image is used for deblurring different images of interest. Since these statistics 28 are based on the image gradients rather than the intensities, kernel estimation process 15 performs the optimization in the gradient domain 18, using $\nabla L_p$ and $\nabla P$, the gradients of $L_p$ and P, respectively. Because convolution is a linear operation, the patch gradients $\nabla P$ should be equal to the convolution of the latent gradients and the kernel $\nabla P = \nabla L_p \otimes K$, plus noise. The preferred embodiment of invention system 11 assumes that this noise is Gaussian with variance $\sigma^2$.

As previously discussed in FIG. 2, the prior $p(\nabla L_p)$ on the latent image gradients is a mixture of C zero-mean Gaussians (with variance $v_c$ and weight $\pi_c$ for the c-th Gaussian). Estimation process 15 uses a sparsity prior $p(K)$ for the kernel that encourages zero values in the kernel, and requires all entries to be positive. Specifically, the prior on kernel values is a mixture of D exponential distributions (with scale factors $\lambda_d$ and weights $\pi_d$ for the d-th component).

Given the measured image gradients $\nabla P$ of patch P, the posterior distribution over the unknowns with Bayes' Rule is:

$$p(K, \nabla L_p \mid \nabla P) \propto (\nabla P \mid K, \nabla L_p) p(\nabla L_p) p(K) \qquad (2)$$

$$= \prod_i N(\nabla P(i) \mid (K \otimes \nabla L_p(i)), \sigma^2) \qquad (3)$$

$$\prod_i \sum_{c=1}^{C} \pi_c N(\nabla L_p(i) \mid 0, v_c) \prod_j \sum_{d=1}^{D} \pi_d E(K_j \mid \lambda_d)$$

where i indexes over image pixels and j indexes over blur kernel elements. N and E denote Gaussian and Exponential distributions respectively. For tractability, system 11 assumes that the gradients in $\nabla P$ are independent of each other, as are the elements in $\nabla L_p$ and K.

A straightforward approach to deconvolution is to solve for the maximum a-posteriori (MAP) solution, which finds the kernel K and latent gradients $\nabla L$ that maximizes $p(K, \nabla L_p \mid \nabla P)$. This is equivalent to solving a regularized-least squares problem that attempts to fit the data while also minimizing small gradients. Applicants tried this (using conjugate gradient search) but found that the algorithm failed. One interpretation is that the MAP objective function attempts to minimize all gradients (even large ones), whereas one expects natural images to have some large gradients. Consequently, the algorithm yields a two-tone image, since virtually all the gradients are zero. If one reduces the noise variance (thus increasing the weight on the data-fitting terms), then the algorithm yields a delta-function for K, which exactly fits the blurred image, but without any deblurring. Additionally, Applicants find the MAP objective function to be very susceptible to poor local minima.

Instead, Applicants' approach is to approximate the full posterior distribution $p(K, \nabla L_p \mid \nabla P)$, and then compute the kernel K with maximum marginal probability. This method selects a kernel that is most likely with respect to the distribution of possible latent images, thus avoiding the overfitting that can occur when selecting a single "best" estimate of the image.

In order to compute this approximation efficiently, Applicants adopt a variational Bayesian approach (Jordan, M. et al., "An introduction to variational methods for graphical models," in *Machine Learning* 37:183-233, 1999) which computes a distribution of $q(K, \nabla L_p)$ that approximates the posterior $p(K, \nabla L_p \mid \nabla P)$. A factored representation is used: $q(K, \nabla L_p) = q(K)q(\nabla L_p)$. For the latent image gradients, this approximation is a Gaussian density, while for the non-negative blur kernel elements, it is a rectified Gaussian. The distributions for each latent gradient and blur kernel element are represented by their mean and variance, stored in an array.

Process 15 also treats the noise variance $\sigma^2$ as an unknown during the estimation process, thus freeing the user from tuning this parameter. This allows the noise variance to vary during estimation: the data-fitting constraint is loose early in the process, becoming tighter as better, low-noise solutions are found. Applicants place a prior on $\sigma^2$, in the form of a Gamma distribution on the inverse variance, having hyperparameters a,b: $p(\sigma^2 \mid a,b) = \Gamma(\sigma^{-2} \mid a, b)$. The variational posterior of $\sigma^2$ is $q(\sigma^{-2})$, another Gamma distribution.

The variational algorithm minimizes a cost function representing the distance between the approximating distribution and the true posterior, measured as: $KL(q(K, \nabla L_p, \sigma^{-2} \mid \nabla P) \| p(K, \nabla L_p \mid \nabla P))$. The independence assumptions in the variational posterior allows the cost function $C_{KL}$ to be factored:

$$< \log \frac{q(\nabla L_p)}{p(\nabla L_p)} >_{q(\nabla L_p)} + < \log \frac{q(K)}{p(K)} >_{q(K)} + < \log \frac{q(\sigma^{-2})}{p(\sigma^2)} >_{q(\sigma^{-2})} \qquad (4)$$

where $<\bullet>_{q(\theta)}$ denotes the expectation with respect to $q(\theta)$. For example, $$<\sigma^{-2}>_{q(\sigma^{-2})} = \int_{\sigma^{-2}} \sigma^{-2} \Gamma(\sigma^{-2} \mid a, b) = b/a.$$

For brevity, the dependence on $\nabla P$ is omitted from this equation.

The cost function $C_{KL}$ is then minimized as follows. The means of the distributions $q(K \mid \nabla P)$ and $q(\nabla L_p \mid \nabla P)$ are set to the initial values of K and $\nabla L_p$ and the variance of the distributions set low, reflecting the lack of certainty in the initial estimate. The parameters of the distributions are then updated alternately by coordinate descent: one is updated by marginalizing out over the other whilst incorporating the model priors. The updates have a closed form solution due to the exclusive use of exponential family distributions in the model. The updates perform a line-search in the direction of the updated parameter values (see Appendix A for details). The updates are repeated until the change in $C_{KL}$ becomes negligible. The mean of the marginal distribution $<K>_{q(K)}$ is then taken as the final value for K. One implementation adapts the source code provided online by Miskin and MacKay at www.inference.phy.cam.ac.uk/jwm1003/train_ensemble.tar.gz.

In the inference formulation outlined above, the possibility of saturated pixels in the image, an awkward non-linearity which violates Applicants' model is neglected. Since dealing with them explicitly is complicated, Applicants prefer to simply mask out saturated regions of the image during the inference procedure so that no use is made of them.

For the variational framework, C=D=4 components is used in the priors on K and $\nabla L_p$. The parameters of the prior on the latent image gradients $\pi_c$, $v_c$ are estimated from the single street scene image, shown in FIG. 2, using EM (Expectation maximization). Since the image statistics vary across scale, each scale level has its own set of prior parameters 28. The parameters for the prior on the blur kernel elements are estimated from a small set of low-noise kernels inferred from real images.

Multi-Scale Approach

The algorithm described above is subject to local minima, particularly for large blur kernels. Hence, Applicants perform camera motion estimation/blur kernel estimation 15 by varying image resolution in a coarse-to-fine manner. To accomplish this, step 16 in FIG. 3 forms a scale pyramid. Initially at step 27, K is set at the coarsest level, e.g., K is a 3×3 kernel. The initial estimate for the latent gradient image is then produced by running the inference formulation while holding K fixed at step 29.

In steps 19 through 33 the inference formulation is run at each scale level. In particular, at step 19 the P data ($\nabla P$) is rescaled at the subject scale level s. The inference formulation of Appendix A is run (step 21) and results in converged values of K and $\nabla L_p$ at subject scale s. These values of K and $\nabla L_p$ are unsampled and act as an initialization for inference at the next scale up. As such, step 23 interpolates or otherwise uses $\nabla L_p$ to form the next scale P data input. At the finest scale, the inference converges to the full resolution kernel K as illustrated at step 25.

The appropriate initialization is determined by looking at any blur kernel artifact in the input blurred image B.

Image Reconstruction

The multi-scale inference procedure (steps 16, 19, 21, 23, 25) outputs an estimate of the blur kernel K, marginalized over all possible image reconstructions. To recover the deblurred image (latent color image L) given this estimate of the kernel, step 17 preferably applies the Richardson-Lucy (RL) algorithm (Richardson 1972 above; and Lucy, L. "Bayesian-based iterative method of image restoration," *Journal of Astronomy* 79:745-754, 1974). Other deconvolution methods are suitable/ usable. RL is a non-blind deconvolution algorithm that iteratively maximizes the likelihood function of a Poisson statistics image noise model. One benefit of this over more direct methods is that it gives only non-negative output values. The preferred embodiment uses Matlab's implementation of the algorithm to estimate L, given K, treating each color channel independently. One embodiment uses 10 RL iterations for example, although for large blur kernels, more may be needed. Before running RL, embodiments clean up K by applying a dynamic threshold, based on the maximum intensity value within the kernel, which sets all elements below a certain value to zero, so reducing the kernel noise. The output of RL is then gamma-corrected using $\gamma=2.2$ and its intensity histogram matched to that of B (using Matlab's histeq function), resulting in L. Pseudo code of a preferred embodiment is outlined in Appendix A.

Appendix A
Image Deblur Pseudo Code

```
Require: Blurry image B; selected sub-window P; maximum blur size φ;
overall blur direction o (= 0 for horizontal, = 1 for vertical); parameters
for prior on VL:Θ_L = {π^s_c, v^s_c}; parameters
for prior on K:Θ_K = {π_d, λ_d}.
Convert P to grayscale.
Inverse gamma correct P (default γ = 2.2).

ΔP_x = P ⊗ [1, -1],          % Compute gradients in x
                              % Compute gradients in y
ΔP_y = P ⊗ [1, -1]^Y, ∇P = [∇P_x, ∇P_y].           % Concatenate gradients
S = [-2 log_2(3/φ)].          % # of scales, starting with 3 × 3 kernel
for s = 1 to S do             % Loop over scales, starting at coarsest
```

-continued

```
∇P^s = imresize(∇P, (1/√2)^(S-s), 'bilinear').    % Rescale gradients if(s = = 1) then                                   % Initial kernel and gradients
  K^s = [0,0,0; 1,1,1; 0,0,0]/3. If(o = = 1), K^s = (K^s)^T.
  [K^s, VL^s_p] = Inference (∇P^s, K^s, ∇P^s, Θ^s_K, Θ^s_L), keeping K^s fixed.
else                                               % Unsample estimates from previous scale
  VL^s_p = imresize(VL^(s-1)_p, √2, 'bilinear').
  K^s = imresize(K^(s-1), √2, 'bilinear').
end if
[K^s, VL^s_p] = Inference(∇P^s, K^s, VL^s_p, Θ^s_K, Θ^s_L).    % Run inference
end for
Set elements of K^S that are < max (K^S)/15 to zero.    % Threshold kernel
  B = edgetaper (B, K^S).                          % Reduce edge ringing
  L = deconvlucy (B, K^S, 10).                     % Run RL for 10 iterations
Gamma correct L (default γ = 2.2).
Histogram match L to B using histeq.
Output: L, K^S.
Inference Routine
Require: Observed blurry gradients ∇P; initial blur kernel K; initial
latent gradients VL_p; kernel prior parameters Θ_K;
latent gradient prior Θ_L.
% Initialize q(K), q(VL_p) and q(σ^-2)
For all m,n, E[k_mn] = K (m,n), V[k_mn] = 10^4.
For all i,j, E[l_ij] = VL_p(i,j), V[l_ij] = 10^4.
E[σ^-2] = 1; % Set initial noise level
ψ = {E[σ^-2], E[k_mn], E[k^2_mn], E[l^2_ij]}      % Initial distribution
repeat
  ψ* = Update(ψ, VL_p, Θ_K, Θ_L)                   % Get new distribution
  Δψ = ψ* - ψ                                      % Get update direction
  α* = arg min_α C_KL(ψ + α · Δψ)                  % Line search
  % C_KL computed using Miskin 2000, "Ensemble Learning for
  Independent Component Analysis", Ph.D. Thesis, University of
  Cambridge, Eqn.'s 3.37–3.39
  ψ = ψ + α * · Δψ                                 % Update distribution
  until Convergence: ΔC_KL < 5 × 10^-3
  K^new = E[k], VL^new_p = E[l].                   % Max marginals
  Output: K^new and VL^new_p.
ψ* = function Update(ψ, VL_p, Θ_K, Θ_L)
% Sub-routine to compute optimal update
% Contribution of each prior mixture component to posterior u_mnd = π_d λ_d e^(-λ_d E[k_mn]);  w_ijc = π_c e^(-(E[l^2_ij]/(2v_c))) √v_c u_mnd = u_mnd/Σ_d u_mnd;  w_ijc = w_ijc/Σ_c w_ijc
k_mn = E[σ^-2]Σ_ij < l^2_i-m,j-n >_q(l)            % Sufficient statistics for q(K)
k"_mn = E[σ^-2]Σ_ij < (∇P_ij - Σ_m'n'≠m,j-n k_m'n' l_i-m',j-n')l_i-m,j-n >_q(l)
  -Σ_d u_mnd 1/λ_d
l'_ij = Σ_c w_ijc/v_c + E[σ^-2]Σ_mn < k^2_m,n >_q(k)    % Sufficient statistics for q(VL_p)
l"_ij = E[σ^-2]Σ_mn < (∇P_i+m,j+n -
  Σ_m'n'≠m,n k_m'n' l_i+m-m',j+n-n')k_n,m >_q(k)

a = 10^-3 + (1/2)Σ_ij (∇P - (K⊗∇L_p))^2_ij;  b = 10^-3 + IJ/2  % S.S. for q(σ^-2)

% Update parameters of q(K)
Semi-analytic form: see Miskin 2000, "Ensemble Learning for
Independent Component Analysis", Ph.D. Thesis, University of
Cambridge, page 199, Eqns. A8 and A9
E[l_ij] = l"_ij/l'_ij; E[l^2_ij] = (l"_ij/l'_ij)^2 + 1/l'_ij.    % Update parameters of q(VL_p)
E[σ^-2] = b/a.                                                   % Update parameters of q(σ^-2)
ψ* = {E[σ^-2], E[k_mn], E[k^2_mn], E[l_ij],                      % Collect updates
E[l^2_ij]}
Return: ψ*
```

While this invention has been particularly shown and described with references to preferred embodiments thereof, it will be understood by those skilled in the art that various changes in form and details may be made therein without departing from the scope of the invention encompassed by the appended claims.

For example, the computer architecture of FIG. 1a-1b is for purposes of illustration and not limitation. Other configurations, architecture and the like are suitable.

Further, Applicants have introduced a method for removing camera shake effects from photographs. This problem appears highly underconstrained at first. However, Applicants have shown that by applying natural image priors and advanced statistical techniques, plausible results can nonetheless be obtained. Such an approach may prove useful in other computational photography problems.

Most of Applicants' effort has focused on kernel estimation, and, visually, the kernels estimated seem to match the image camera motion. The results of some embodiments contain artifacts; most prominently, ringing artifacts occur near saturated regions and regions of significant object motion. Applicants suspect that these artifacts can be blamed primarily on the non-blind deconvolution step. Thus, some embodiments may apply modern statistical methods to the non-blind deconvolution problem to achieve improved results.

There are a number of common photographic effects that the foregoing does not explicitly model, including saturation, object motion and compression artifacts. Thus, other embodiments may incorporate these factors into the model. In the foregoing embodiments, Applicants assume images to have a linear tonescale, once the gamma correction has been removed. However, cameras typically have a slight sigmoidal shape to their one response curve so as to expand their dynamic range. Thus in some embodiments, this non-linearity would be removed, by estimating it during inference, or by measuring the curve from a series of bracketed exposures or the like. Additionally, the present invention method may make use of more advanced natural image statistics, such as correlations between color channels, or the fact that camera motion traces a continuous path (and thus arbitrary kernels are not possible). There is also room to improve the noise model in the algorithm. Although the above described embodiments are based on Gaussian noise in image gradients, other noise models (for image sensor noise) are suitable.

Also, although the foregoing embodiments require some manual intervention, these steps could be eliminated by employing more exhaustive search procedures, or heuristics to guess the relevant parameters.

Cameras producing the subject blurred images of interest to the present invention include digital as well as film-based cameras. The camera produced image is then made into a digital form for application of the present invention. Alternatively, the present invention may be applied during operation of a digital camera (the present invention software being built into the digital camera processor) and the like.

In other embodiments, the model natural image is related to the subject blurred image. In these embodiments, aspects of the model image are used to estimate what the statistics of the subject image ought to be.

What is claimed is:

1. A method for deblurring an image comprising the computer implemented steps of:
   providing statistics on distribution of gradients of intensities of a known model natural image;
   receiving a single input image defining a subject image having blur;
   estimating a blur kernel and a solution image portion corresponding to a sample area of the subject image, by applying the statistics to gradients of intensities of the sample area and solving for most probable solution image, said estimating resulting in a blur kernel, wherein the model natural image is free of measurement to be related to the subject image; and
   deconvoluting the subject image using the resulting blur kernel, the deconvoluting generating a deblurred image corresponding to the subject image.

2. A method as claimed in claim 1 wherein the step of estimating includes performing an estimation procedure at multiple scales staffing with a coarse resolution version of the sample area and increasing resolution to a final scale in which the sample area is at a resolution as it is in the input image.

3. A method as claimed in claim 2 wherein for each scale, the gradients of intensities of the most probable solution image are used to interpolate an input sample area for a next scale.

4. A method as claimed in claim 1 wherein the model natural image is used for deblurring different subject images such that a same one model natural image is used across different subject images.

5. A method as claimed in claim 1 wherein blur of the subject image is due to camera shake.

6. A method as claimed in claim 5 wherein the camera is any of a digital camera and a film-utilizing camera.

7. A method as claimed in claim 1 wherein the step of estimating includes employing variational Bayesian techniques.

8. A method as claimed in claim 1 wherein the step of receiving further includes linearizing intensities of the subject image.

9. Computer apparatus for deblurring an image, comprising:
   a computer processor; and
   a storage device that stores a set of statistics on distribution of gradients of intensities of a model natural image, and a program for execution by the computer processor, the program comprising:
   a preprocessor for receiving a single input image defining a subject image having blur;
   a motion estimator estimating a blur kernel and a solution image portion corresponding to a sample area of the subject image, by applying the statistics to gradients of intensities of the sample area and solving for most probable solution image, said estimating resulting in a blur kernel, wherein the model natural image is free of measurement to be related to the subject image; and
   a deconvoluter for deconvoluting the subject image using the resulting blur kernel, the deconvoluting generating a deblurred image corresponding to the subject image.

10. Computer apparatus as claimed in claim 9 wherein the motion estimator performs an estimation procedure at multiple scales staffing with a coarse resolution version of the sample area and increasing resolution to a final scale in which the sample area is at its input image resolution.

11. Computer apparatus as claimed in claim 10 wherein for each scale, the gradients of intensities of the most probable solution image are used to interpolate an input sample area for a next scale.

12. Computer apparatus as claimed in claim 9 wherein the model natural image is used for deblurring different subject images such that a same one model natural image is used across different subject images.

13. Computer apparatus as claimed in claim 9 wherein blur of the subject image is due to camera shake and the motion estimator effectively estimates path of the camera shake.

14. Computer apparatus as claimed in claim 13 wherein the camera is any of a digital camera and a film-utilizing camera.

15. Computer apparatus as claimed in claim 9 wherein the motion estimator employs variational Bayesian techniques.

16. Computer apparatus as claimed in claim 9 wherein the preprocessor further linearizes the subject image so that the subject image has a linear color space.

17. A computer system for deblurring an image, comprising:
   means for providing statistics on distribution of gradients of intensities of a known model natural image;
   means for receiving a single input image defining a subject image having blur;
   motion estimation means for estimating a blur kernel and a solution image portion corresponding to a sample area of the subject image, by applying the statistics to gradients of intensities of the sample area and solving for most probable solution image, said estimating resulting in a blur kernel, wherein the known model natural image is free of measurement related to the subject image; and
   deconvolution means for deconvoluting deconvoluting the subject image using the resulting blur kernel, the deconvoluting generating a deblurred image corresponding to the subject image.

18. A computer system as claimed in claim 17 wherein the motion estimation means performs an estimation procedure at multiple scales staffing with a coarse resolution version of the sample area and increasing resolution to a final scale in which the sample area is at its input image resolution; and
   wherein for each scale, the gradients of intensities of the most probable solution image are used to interpolate an input sample area for a next scale.

19. A computer system as claimed in claim 17 wherein blur of the subject image is due to camera shake and the motion estimator effectively estimates path of the camera shake, associated camera is any of a digital camera and a film-utilizing camera.

20. A computer system as claimed in claim 17 wherein the motion estimation means employs variational Bayesian techniques.

21. A computer system as claimed in claim 17 wherein the means for receiving includes a preprocessor, the preprocessor linearizing the subject image so that the subject image has a linear set of intensities.

* * * * *

UNITED STATES PATENT AND TRADEMARK OFFICE
CERTIFICATE OF CORRECTION

PATENT NO. : 7,616,826 B2
APPLICATION NO. : 11/495062
DATED : November 10, 2009
INVENTOR(S) : William T. Freeman et al.

It is certified that error appears in the above-identified patent and that said Letters Patent is hereby corrected as shown below:

In Claim 2, Column 12, line 6, delete "staffing" and insert --starting--;

In Claim 10, Column 12, line 49, delete "staffing" and insert --starting--;

In Claim 18, Column 14, line 3, delete "staffing" and insert --starting--.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,616,826 B2
APPLICATION NO. : 11/495062
DATED : November 10, 2009
INVENTOR(S) : Freeman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Nineteenth Day of October, 2010

David J. Kappos
*Director of the United States Patent and Trademark Office*